United States Patent [19]

Kinugawa et al.

[11] Patent Number: 4,794,234
[45] Date of Patent: Dec. 27, 1988

[54] ELECTRONIC APPARATUS

[75] Inventors: Kiyoshi Kinugawa; Seio Kainoh, both of Nara, Japan

[73] Assignee: Sharp Kabushiki Kaisha, Osaka, Japan

[21] Appl. No.: 89,398

[22] Filed: Aug. 26, 1987

[30] Foreign Application Priority Data

Aug. 26, 1986 [JP] Japan .................. 61-130436[U]

[51] Int. Cl.⁴ .............................................. G06C 5/02
[52] U.S. Cl. ................................... 235/1 D; 235/1 R; 235/145 R; 200/5 A
[58] Field of Search ................. 235/1 D, 145 R, 1 R; 200/5 A

[56] References Cited

U.S. PATENT DOCUMENTS

| 4,449,023 | 5/1984 | Hilhorst et al. | 200/5 A X |
| 4,531,050 | 7/1985 | Kaneko | 235/1 D |
| 4,567,354 | 5/1986 | Sekine | 235/145 R |
| 4,680,455 | 7/1987 | Kuo | 235/1 D X |

FOREIGN PATENT DOCUMENTS 3336834 4/1984 Fed. Rep. of Germany .
8608618 7/1986 Fed. Rep. of Germany .

Primary Examiner—B. R. Fuller
Attorney, Agent, or Firm—Birch, Stewart, Kolasch & Birch

[57] ABSTRACT

An electronic apparatus including a cabinet, and a lens provided in the cabinet, a transparent keyboard provided on the lens, so that images of things such as letters below the electronic apparatus are magnified and can be seen from the obverse side of said electronic apparatus.

3 Claims, 3 Drawing Sheets

FIG. I

ELECTRONIC APPARATUS

BACKGROUND OF THE INVENTION

The present invention relates to an electronic apparatus, and more particularly, to an electronic apparatus with a lens built in the body.

Conventionally, a thin electronic apparatus such as an electronic calculator is not effectively combined with a magnifying lens which is used to see things such as a manuscript. Therefore, an apparatus is desired which is also used to magnify the image of things such as a manuscript.

SUMMARY OF THE INVENTION

Accordingly, it is an object of the present invention to provide an electronic apparatus available for magnifying the image of things such as a manuscript.

It is another object of the present invention to provide a small, thin electronic apparatus with a lens built in the cabinet and with transparent input keys above the lens.

Briefly described, in accordance with the present invention, an electronic apparatus comprises a cabinet, a lens mounted in the cabinet, whereon a transparent key input means is provided, so that the image of things such as letters below the electronic apparatus are magnified and can be seen from the obverse side of the electronic apparatus.

An advantage of the present invention is that the space for mounting the necessary parts such as a keyboard, display, such that power source is utilized and no additional space is required for a lens. The reverse side of the apparatus can be seen through the obverse side with a built-in lens and with a transparent keyboard above the lens. Therefore, a small, thin electronic apparatus with a lens is provided.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
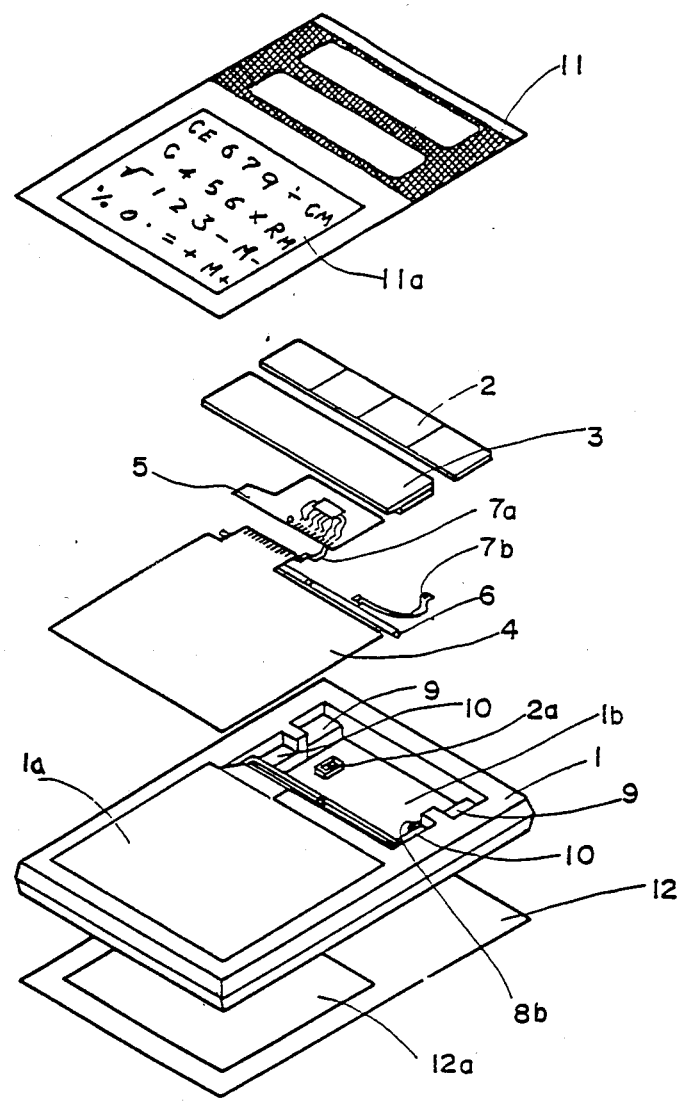
FIG. 1 is an exploded view for explaining the electronic apparatus according to an embodiment of the present invention.

FIG. 1 is an exploded view of an electronic calculator embodying a preferred embodiment of the present invention.

A cabinet 1 is made of a transparent resin with a built-in Fresnel lens 1a. The Fresnel lens 1a is integrally formed or combined with a cabinet 1. The cabinet 1 has a hole 1b in which a solar battery 2 and liquid crystal cell 3 are put.

A key sheet 4 has transparent electrodes at the corresponding places to the key symbols. The key sheet 4 is mounted on the Fresnel lens 1a.

The key sheet 4 is electrically connected to an LSI (Large Scale Integrated) chip 5. An application rubber 6 is provided for such connection.

Terminals 7a and 7b are provided for supplying the electric power of the solar cell 2 to the chip 5 and are electrically connected to connectors 8a and 8b, respectively.

The liquid crystal cell 3 is electrically connected to the LSI chip 5 and the key sheet 4.

The solar cell 2 has on its reverse side an adhesive double-coated tape and is attached to a step portion 9 formed adjacent to the hole 1b. In the same way, the liquid crystal cell 3 has on its reverse side an adhesive double-coated tape and is fixed to another step portion 10 formed adjacent to the hole 1b.

A PET (polyethylene terephthalate) sheet 11 is attached to the obverse side of the electronic calculator. The portion of the PET sheet corresponding to the solar cell 2 and liquid crystal cell 3 is transparent. The keyboard 11a for inputting information is also transparent. The keyboard 11a corresponds to the key sheet 4. Key symbols 1, 2, 3, . . . are printed on the keyboard 11a. The remaining portion of the PET sheet 11 is opaque so that the inside of the apparatus may not be seen.

The PET sheet 12 is attached to the reverse side of the electronic calculator. The portion 12a of the PET sheet 12 corresponding to the Fresnel lens 1a is transparent. The remaining portion of the PET sheet 12 is opaque.

After mounting the above-mentioned parts in the cabinet 1, PET sheets 11 and 12 are attached to the cabinet 1 so that the two sheets may sandwich the cabinet 1.

Consequently, the parts of the electronic calculator above or below the Fresnel lens are all transparent. Accordingly, the image of things such as letters below the cabinet 1 is magnified by the Fresnel lens 1a and can be seen through the keyboard 11a of the obverse PET sheet 11.

Figure 2:
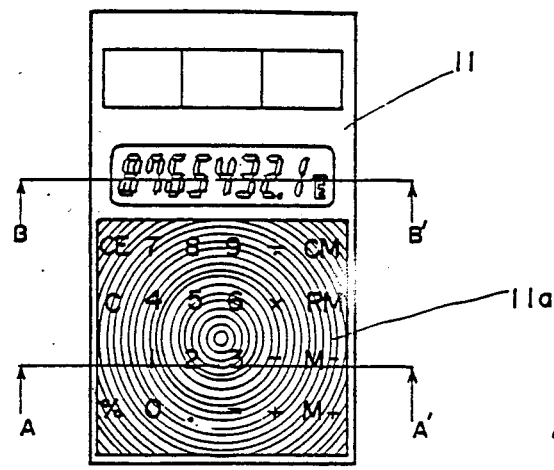
FIG. 2 is a plan view of the electronic apparatus.

FIG. 2 shows a plan view of the electronic calculator thus assembled.

The image of letters and the like under the electronic calculator can be magnified and can be seen at the keyboard portion 11a of the obverse PET sheet 11.

Figure 3:
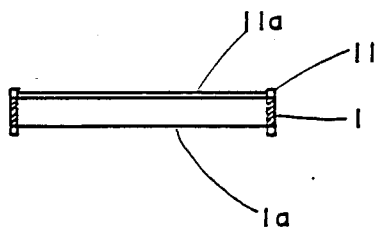
FIGS. 3 and 4 are cross-sectional views of the electronic apparatus.
Figure 4:
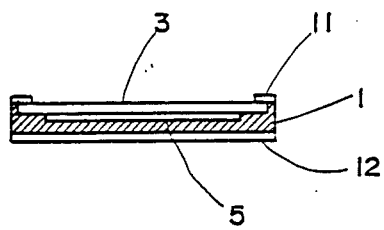

FIG. 3 shows a cross sectional view taken along the line A-A' of FIG . 2. FIG. 4 shows a cross sectional view taken along the line B-B' of FIG. 2. Like parts are shown by like reference numbers throughout the figures.

The printing ink of the key symbols on the keyboard 11a is, preferably, of good transparence so that the use of Fresnel lens may not be obstructed.

Although the detail description of the above-mentioned keyboard is omitted herein as not being related to the crux of the present invention, the keyboard has a touchkey mechanism.

In this embodiment, a keyboard which takes up a significant amount of space can be utilized as a lens and a wide range of lens usages are possible.

Figure 5:
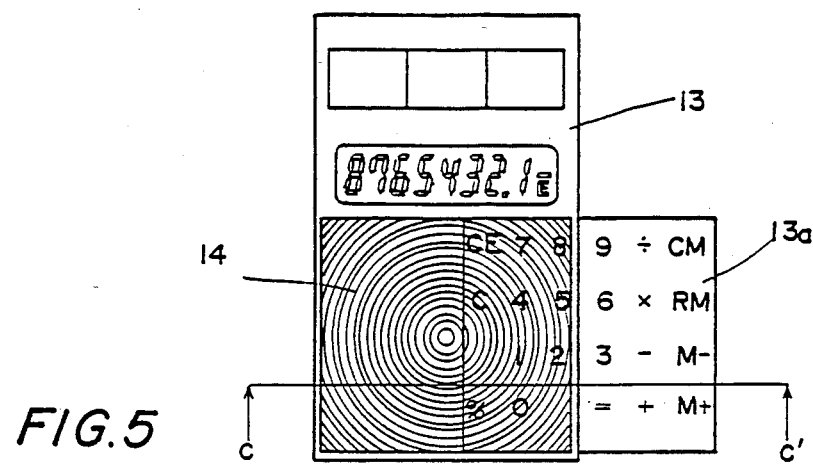
FIG. 5 is a plan view of another electronic apparatus according to another embodiment of the present invention.

FIG. 5 shows another preferred embodiment of the present invention in which a keyboard is detachable so that the Fresnel lens may be used without being obstructed by key symbols.

A keyboard 13a of an obverse PET sheet 13 can be drawn out from a side of the electronic calculator. The keyboard has printed key symbols such as "1, 2, 3, ..." With the keyboard 13a detached, the image mangified by the Fresnel lens 14 can be seen without being obstructed by the key symbols.

Figure 6:
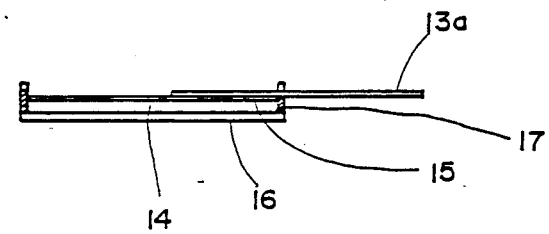
FIG. 6 is a cross-sectional view of the electronic apparatus.
Figure 7:
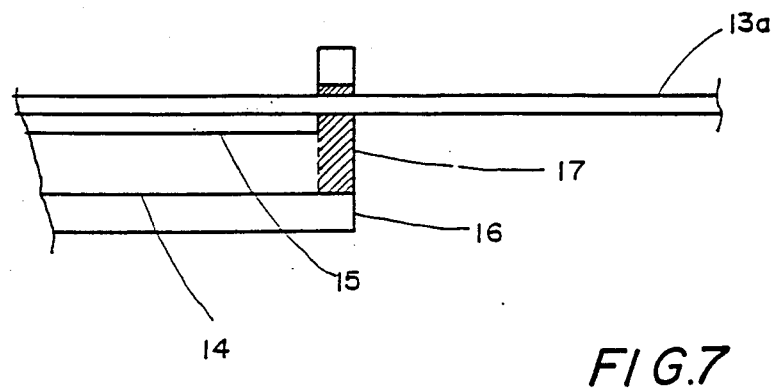
FIG. 7 is a partial enlarged cross-sectional view of the electronic apparatus.

FIG. 6 shows a cross sectional view taken along the line C–C' of FIG. 5. FIG. 7 shows a partial enlarged view of FIG. 6. Like parts are shown by like reference numbers throughout the figures.

A key unit 15 is transparent and mounted between the keyboard 13a and the Fresnel lens 14. A key input portion includes the keyboard 13a and the key unit 15. The internal structure of the second embodiment is the same as that of the first embodiment, and only a reverse PET sheet 16 and a cabinet 17 are shown.

An advantage of the present invention is that the space for mounting the necessary parts such as a keyboard, display, and power source is utilized and no additional space is required for a lens. The reverse side of the apparatus can be seen through the obverse side with a built-in lens and with a transparent keyboard above the lens. Therefore, a small, thin electronic apparatus with a lens is provided.

While only certain embodiments of the present invention have been described, it will be apparent to those skilled in the art that various changes and modifications may be made therein without departing from the spirit and scope of the present invention as claimed.

What is claimed is:
1. An electronic apparatus comprising:
a transparent cabinet member for housing components of said electronic apparatus;
a lens member integrally formed in a portion of said cabinet member:
transparent key input means for inputting information into said electronic apparatus, said transparent key input means overlaying said lens member;
a transparent face member overlaying said transparent cabinet member on a first major surface thereof, said transparent face member including a plurality of key imput indicia corresponding to a plurality transparent electrodes on said transparent key input means; and
a transparent base member overlaying said transparent cabinet member on a second major surface thereof;
wherein said electronic apparatus has a transparent viewing area coextensive throughout the superimposed layers so that images below said electronic apparatus are magnified when viewed from the side of the first major surface.

2. The electronic apparatus according to claim 1, wherein said plurality of key input indicia of said transparent face member are removable from said electronic apparatus, whereby total unobstructed and magnified viewing is achieved through said electronic apparatus.

3. The electronic apparatus according to claim 1, wherein said lens member is a Fresnel lens.

* * * * *